United States Patent [19]

Jou et al.

[11] 4,023,422
[45] May 17, 1977

[54] INTERIOR AND OUTER WIPER OF CAR

[76] Inventors: Chiou Ming Jou, No. 38, Lane 34, Min-Chu Road, Pan-Chiao; Yang Youn Kung, No. 21, Lane 127, Huai-Teh St., Nan-Tsueili, Pan-Chiao, both of China /Taiwan

[22] Filed: Jan. 16, 1976

[21] Appl. No.: 649,576

[52] U.S. Cl. .............................. 74/70; 15/250.28; 192/70.15; 192/66
[51] Int. Cl.² ...................................... F16H 21/40
[58] Field of Search ............. 15/250.28; 192/48.9, 192/64, 65, 66, 70.15; 74/70–71

[56] References Cited

UNITED STATES PATENTS

| 158,967 | 1/1875 | Mundy | 192/66 |
|---|---|---|---|
| 1,429,280 | 9/1922 | Godfrey | 192/48.9 |
| 1,689,214 | 10/1928 | Small | 15/250.28 |
| 1,907,171 | 5/1933 | Anderson | 192/48.9 |
| 2,443,491 | 6/1948 | Andres | 192/48.9 |

FOREIGN PATENTS OR APPLICATIONS

| 276,222 | 2/1913 | Germany | 192/70.15 |

*Primary Examiner*—Samuel Scott
*Assistant Examiner*—Wesley S. Ratliff, Jr.
*Attorney, Agent, or Firm*—Cushman, Darby & Cushman

[57] ABSTRACT

An interior and outer wiper of car can be used to scrape the rain water or fog either inside or outside a car. This wiper is designed to clear the driver's sight to prevent from occurring traffic accident. Either the interior or the outer wiper can be used. Both the interior and outer wiper can be used at the same time. They may be operated synchronously by means of a cam.

1 Claim, 7 Drawing Figures

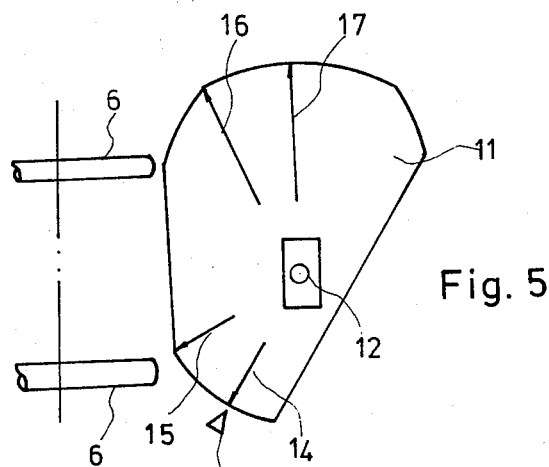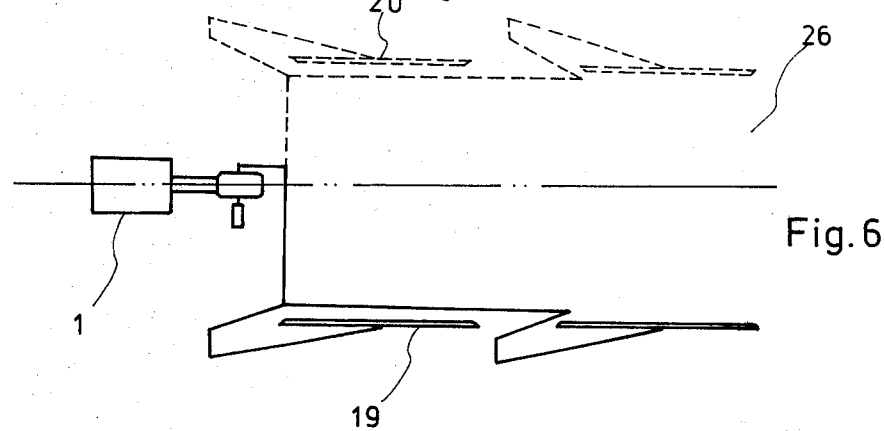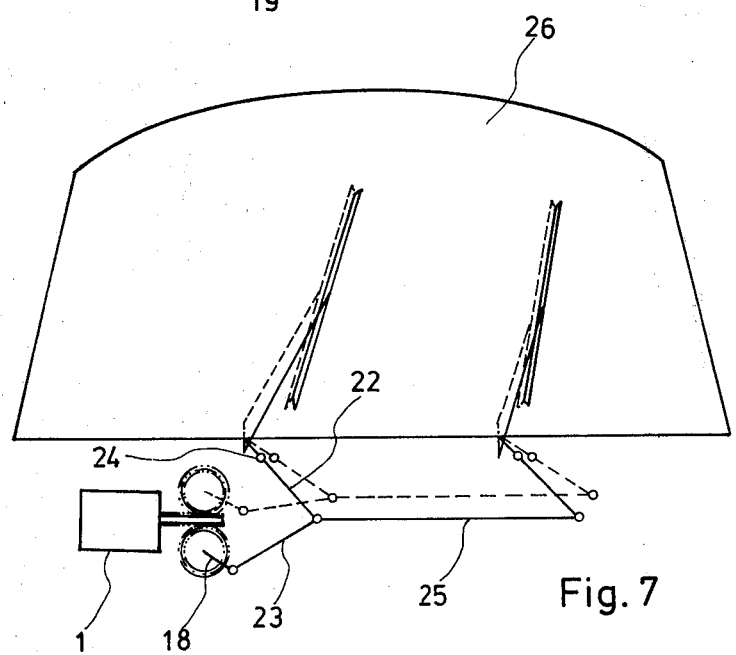

INTERIOR AND OUTER WIPER OF CAR

BACKGROUND OF THE INVENTION

The conventional wiper is constructed and installed outside the windshield of a car. During rainy or cold weather, the car doors are always closed to prevent the penetration of outside cold or moisture air. The air within the car will then be affected without flow. The exhausted carbon dioxide gas from human body, the moisture or the contaminated air will accumulate at the windshield which will then obstruct the driver's sight and can easily cause a traffic accident. The present inventors have addressed themselves to this problem and set forth the present invention which provides for both interior and outer wipers so as to clear the driver's line of vision and thus enhance traffic safety.

SUMMARY OF THE INVENTION

The present invention relates to a new wiper means having an interior wiper and outer wiper which may serve to clear the driver's line of vision.

The present invention is composed of the interior wiper and outer wiper. Each wiper is driven by means of link means which is connected to a coupling shaft and is driven therefrom. The coupling shaft is inserted into a gear by coinciding a conical body on said shaft into the corresponding cone in said gear. The gear is driven by a worm which is originally driven by a motor. A cam is provided to actuate either or both of the interior and outer wiper which is located outside the coupling shaft.

BRIEF DESCRIPTION OF THE DRAWINGS

FIG. 5 is the drawing of cam and the controlled position thereon according to the present invention;

FIG. 6 is the top view drawing after assembling the wiper;

FIG. 7 is the front view drawing of the present invention.

DESCRIPTION OF THE PREFERRED EMBODIMENT

Figure 1:
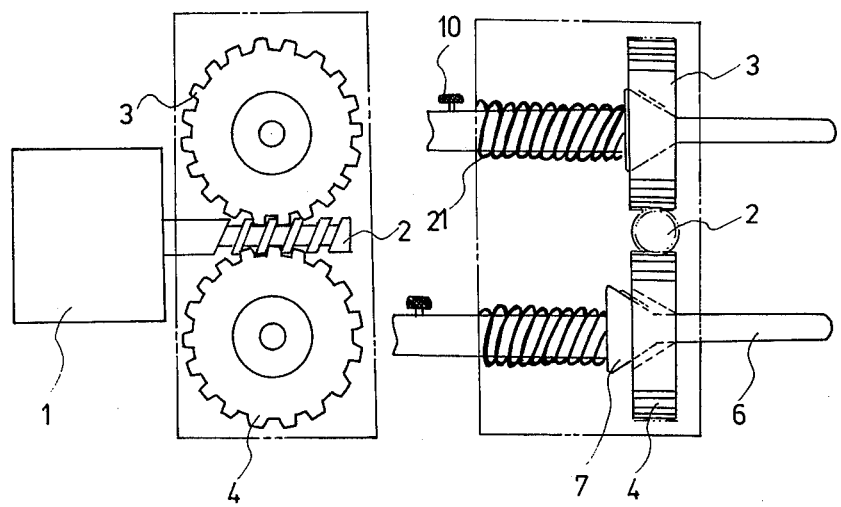
FIG. 1 is the illustrative drawing to show the driving mechanism by a motor.
Figure 2:
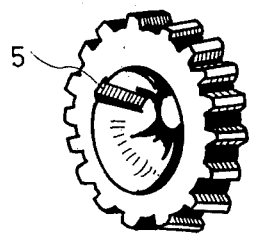
FIG. 2 is a perspective drawing of the special gear according to the present invention.
Figure 3:
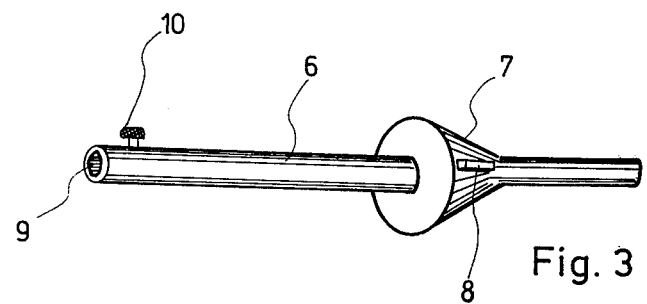
FIG. 3 is a drawing of coupling shaft of the present invention.

The worm 2 is driven by motor 1 as shown in FIG. 1. Said worm 2 will then actuate the gear 3 and gear 4 for doing work. Referring to FIG. 2, said gear 3 and 4 are made conical internally and are formed a key groove 5 therein. A coupling shaft 6 as shown in FIG. 3 is formed a conical body 7 at one end thereof. Said conical body 7 is shaped coincidentally as the previous internal cone. A key 8 is extended on the conical body 7. Whenever the conical body 7 coincides with gear 3 and 4 and key 8 also engages with key groove 5, it will transfer the driving force from motor 1 to coupling shaft 6. At another end of coupling shaft 6, is formed a hollow hole 9 and is fixed a screw 10 on the periphery of said shaft by which the link A 18 of wiper can be inserted into said hole 9 and be fixed by fixing screw 10. A cam 11 is installed outside the coupling shaft and is rotated around the axis 12 serving as fulcrum. On the cam surface, four letter A,B,C,D (14, 15, 16, 17) are printed thereon which may correspond to the fixing mark 13.

The principle of the present invention is further explained as follows:

The motor 1 will drive the worm 2 and, in turn, drive the gear 3 and 4. Whenever the conical body 7 is inserted into gear 3 and 4 and key 8 on conical body 7 engaging the key groove 5, the coupling shaft 6 will be driven by gears 3 and 4. The link A 18 connecting to said shaft 6 by means of fixing screw 10 and inserting the link into shaft hole 9 will thus be driven accordingly.

For optionally operating the interior wiper 19 or outer wiper 20, a cam 11 is provided outside the coupling shaft 6 of which axis 12 may serve as a fulcrum. Whenever the indicating letter A 14 on cam 11 meets the fixing mark 13, the cam 11 will separate from coupling shaft 6, both the interior and outer wiper will be actuated synchronously; whenever letter B 15 meets mark 13, the shaft 6 of outer wiper will be pressed outward by cam 11 and separated from gear 3, the interior wiper 19 will thus be actuated singly; When rotating indication C 16 to meet mark 13, both of interior and outer will stop their action; When marking indication D 17, the outer wiper 20 will be actuated. The shaft 6 will be resiliently back by means of spring 21.

Figure 4:
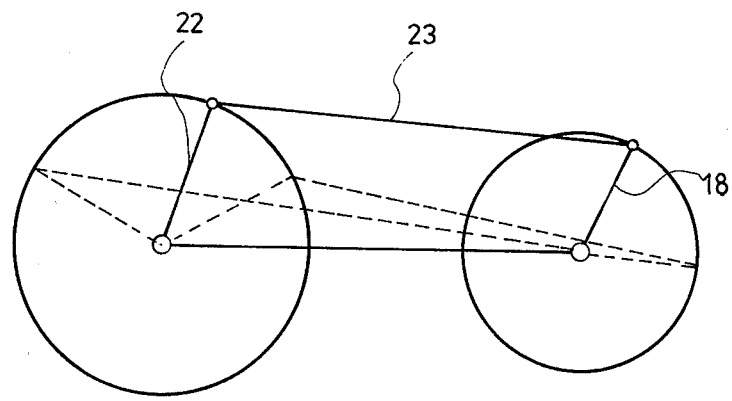
FIG. 4 is a drawing illustrating the operation principle of the wiper.

The operating mechanism of the wipers is shown in FIG. 4 and FIG. 7. The length of link A 18 is shorter than link B 22. When the link A 18 is rotating with respect to gear 3, 4 and link B 22 is driven by coupling rod 23. Although said link A 18 will rotate a turn, link B 22 will only vibrate for a specific angle along the fulcrum 24. Wiper 19 and 20 are correspondingly vibrated as being connected to point 24. Link C 25 is provided to connect pair of wipers for their synchronous operation.

We claim:

1. A windshield wiper assembly comprising:

a motor;

a worm gear driven by said motor;

first and second conical gears coupled to said worm gear so as to be rotated thereby, each conical gear having a conical shaped opening therethrough about an axis;

first and second coupling shafts each having a conical body for engagement with one of said conical openings so as to couple a shaft and conical gear together for rotation and each movable along said axis for engagement and disengagement;

first and second wiper blades for mounting inside and outside a windshield;

first and second link means respectively connecting said respective coupling shafts to respective wiper blades for causing reciprocal wiping movement of a wiper blade when the coupling shaft connected thereto is rotated; and a cam having a first position disengaged from said shafts so that said shafts engage and rotate with said conical gears to reciprocate both said first and second wiper blades, a second position in which said cam engages only one of said shafts to cause said shaft to move along said axis and disengage from said conical gear so that only the wiper blade reciprocates which is connected to the other coupling shaft, a third position in which said cam engages both of said shafts to cause both shafts to move along said axis and neither of said blades to reciprocate and a fourth position in which said cam engages only said other of said shafts to cause said other shaft to move along said axis and disengage from said conical gear so that only the wiper blade reciprocates which is connected to said one shaft.

* * * * *